United States Patent [19]

Kluger

[11] 4,147,239
[45] Apr. 3, 1979

[54] DRUM BRAKE ASSEMBLY HAVING INTEGRAL CABLE SUPPORT

[75] Inventor: Michael A. Kluger, South Bend, Ind.

[73] Assignee: The Bendix Corporation, Southfield, Mich.

[21] Appl. No.: 838,277

[22] Filed: Sep. 30, 1977

[51] Int. Cl.² ............................................. F16D 65/56
[52] U.S. Cl. ............................................ 188/79.5 GC
[58] Field of Search .................. 188/79.5 P, 79.5 GC, 188/6 T, 196 BA

[56] References Cited

U.S. PATENT DOCUMENTS

| | | | |
|---|---|---|---|
| 2,935,163 | 5/1960 | Burnett | 188/79.5 GC |
| 3,118,519 | 1/1964 | Swift | 188/79.5 GC |

Primary Examiner—Duane A. Reger
Attorney, Agent, or Firm—Paul David Schoenle; Ken C. Decker

[57] ABSTRACT

A drum brake assembly includes a backing plate which supports a pair of brake shoes and a hydraulic actuator is engageable with the pair of brake shoes to urge the latter into braking engagement with a drum. An adjuster also engages the pair of brake shoes to maintain a running clearance between the drum and the pair of brake shoes. A cable between the backing plate and the adjuster connects with one of the pair of brake shoes in order to actuate the adjuster when the one brake shoe moves relative to the backing plate. The connection between the cable and one brake shoe is provided by a grooved-arcuate tab integrally formed from the one brake shoe.

4 Claims, 3 Drawing Figures

DRUM BRAKE ASSEMBLY HAVING INTEGRAL CABLE SUPPORT

BACKGROUND OF THE INVENTION

In U.S. Pat. No. 3,103,992, a pair of brake shoes are urged by a hydraulic actuator into engagement with a drum to effectuate braking. An adjustment mechanism opposite the hydraulic actuator is engaged with the pair of brake shoes to take up wear in the brake shoes, thereby maintaining a running clearance between the pair of brake shoes and the drum. In order to actuate the adjustment mechanism a cable extends from a backing plate post to the adjuster mechanism and a guide plate receives the cable so that movement of the brake shoe which supports the guide plate pulls the cable to actuate the adjustment mechanism.

As the guide plate is separate from the one brake shoe and requires attachment to the one brake shoe during assembly, it is believed to be an improvement over the state of the art if the function of the guide plate can be provided in the drum brake assembly without requiring a separate part.

SUMMARY OF THE INVENTION

The present invention relates to an improvement in a drum brake assembly wherein a pair of brake shoes are urged into frictional engagement with a drum by a hydraulic actuator and an adjustment mechanism between the pair of brake shoes maintains a running clearance between the pair of brake shoes and the drum. In particular, a cable is anchored to a backing plate and is engaged with the adjustment mechanism so that upon movement of one of the brake shoes relative to the backing plate the cable is pulled by the one brake shoes to actuate the adjustment mechanism. The one brake shoe is provided with a projection extending from either a rim or a web to slidably engage the cable.

It is an object of the present invention to eliminate the guide plate used in the prior art, while at the same time providing the one brake shoe with a projection for slidably engaging the cable.

Figure 1:
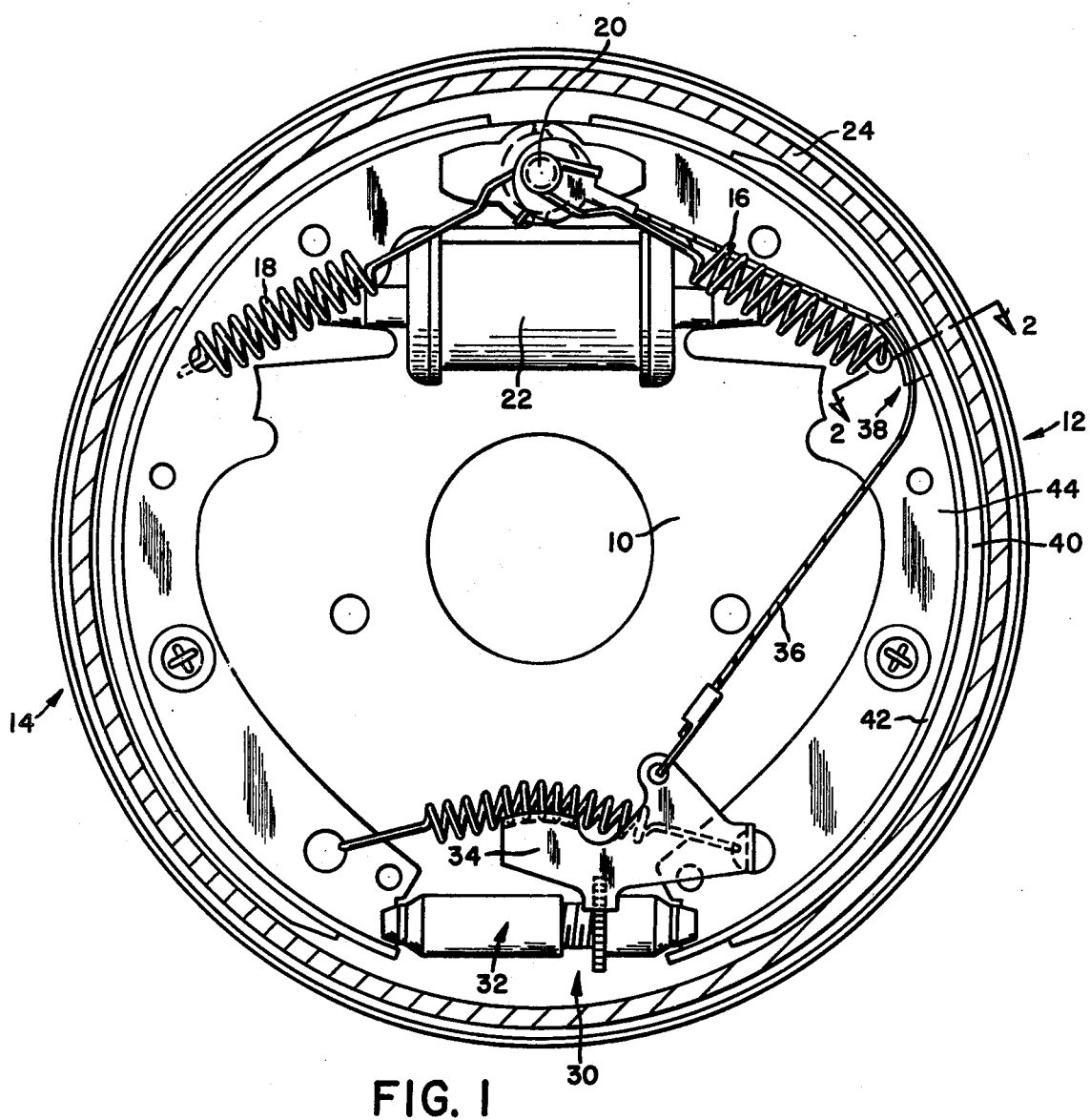
FIG. 1 is a front elevational view of a drum brake assembly constructed in accordance with the invention.

The drum brake assembly illustrated in FIG. 1 includes a backing plate 10 which supports a pair of brake shoes 12 and 14. The brake shoes are biased by retraction springs 16 and 18, respectively, toward a post 20 which is anchored to the backing plate 10.

A hydraulic actuator 22 is disposed between the pair of brake shoes 12 and 14, near the post 20. The hydraulic actuator is operable to urge the pair of brake shoes into frictional engagement with a rotatable drum 24, thereby effecting a brake application.

In order to maintain a running clearance between the pair of brake shoes and the drum during non-braking, an adjustment mechanism 30 is disposed between the pair of brake shoes, opposite they hydraulic actuator 22. An extendible strut at 32 is engageable with a pawl 34 to extend the strut when the clearance between the pair of brake shoes and the drum is greater than a predetermined running clearance.

Figure 2:
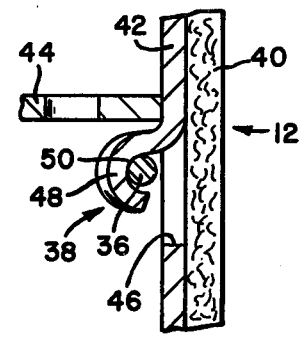
FIG. 2 is an enlarged cross-sectional view taken along line 2-2 of FIG. 1.

In accordance with the invention, the pawl 34 is rotated relative to the strut 32 by means of a cable or connecting member 36 extending from the post 20 to the pawl 34 via a sliding engagement with the one brake shoe 12. Turning to FIG. 2, it is seen that the sliding engagement between the cable 36 and the one brake shoe 12 is provided by means of a projection 38 extending from the one brake shoe 12. In particular, the brake shoe 12 includes a friction lining 40 which is attached to a rim 42 by bonding or rivets (not shown) and a web 44 extends perpendicular from the rim 42.

The projection 38 is integrally formed with the rim 42 by punching or stamping a portion of the rim radially inwardly. The stamped portion is disposed adjacent the rim to form a substantially central aperture 46 which permits the escape of lining gases from the friction lining 40. The projection is also formed with a curved portion 48 which defines a groove 50 for slidably receiving the cable 36. Moreover, the projection 38 opens away from the web 44 so that the cable 36 can be inserted in the groove 50 without any interference from the web 44.

Figure 3:
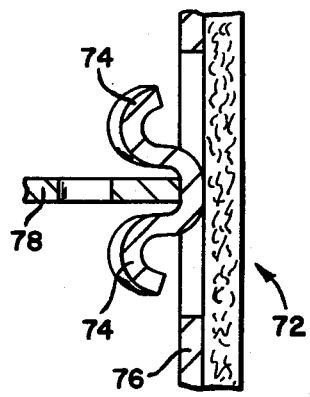
FIG. 3 is a cross-sectional view similar to FIG. 2 showing an alternative embodiment.

In FIG. 3, a brake shoe 72 is illustrated with a pair of projections 74 stamped from the rim 76. The pair of projections extend radially inwardly on opposite sides of the web 78. With this construction it is possible to use the right brake shoe for the left brake shoe in the drum brake arrangement of FIG. 1 so that the pair of brake shoes are reversible, right to left and vice versa.

Although the drawings illustrate a projection stamped from the rim 42 in FIG. 2, it is possible to stamp a similar projection from the web 44 for the purpose of slidably engaging and supporting the cable 36.

MODE OF OPERATION

The drum brake assembly shown in FIG. 1 operates in conventional manner. During braking, pressurized fluid is directed or communicated to the hydraulic actuator 22 in order to radially expand the pair of brake shoes into friction engagement with the drum 24. As the cable 36 is anchored to the post 20, the radial movement of the brake shoe 12 causes the projection 38 to pull on the cable 36, thereby rotating the pawl 34 relative to the extendible strut 32. Moreover, the radially expanding brake shoe 12 pivots about the adjustment mechanism 30 so that the cable 36 slides on the projection when the brake shoe pivots relative to the adjustment mechanism 30. If the clearance between the pair of brake shoes and the drum is greater than a predetermined running clearance, the pawl 34 cooperates with the extendible member 32 to increase the spacing between the pair of brake shoes, thereby reducing the clearance between the drum and brake shoes. If the clearance is less than or equal to the predetermined running clearance, the brake shoe 12 does not expand radially enough to actuate the pawl 34 and extendible member 32 via the cable 36.

Although the operation of the drum brake assembly remains the same as taught by the prior art, the structure of the present invention provides for slidably supporting an adjustor cable by means of a projection extending from the brake shoe. Consequently, a lighter and simpler drum brake assembly results from the teaching herein.

I claim:

1. In a drum brake assembly having a backing plate which supports a pair of brake shoes, a hydraulic actuator which urges the pair of brake shoes into a braking position engaging a drum and an adjustment mechanism disposed between the pair of brake shoes for maintaining a running clearance between the pair of brake shoes and the drum, the improvement in which a connecting member connects with said adjustment mechanism, one of said pair of brake shoes, and said backing plate in order to actuate said adjustment mechanism when said one brake shoe moves relative to said backing plate, said one brake shoe including a projecting portion slidably engaging said connecting member to connect said connecting member with said one brake shoe;

said one brake shoe including a friction lining which attaches to a rim and said projecting portion on said brake shoe projects from said rim.

2. In a drum brake assembly having a backing plate which supports a pair of brake shoes, a hydraulic actuator which urges the pair of brake shoes into a braking position engaging a drum and an adjustment mechanism disposed between the pair of brake shoes for maintaining a running clearance between the pair of brake shoes and the drum, the improvement in which a connecting member connect with said adjustment mechanism, one of said pair of brake shoes, and said backing plate in order to actuate said adjustment mechanism when said one brake shoe moves relative to said backing plate, said one brake shoe including a projecting portion slidably engaging said connecting member to connect said connecting member with said one brake shoe;

said one brake shoe including a friction lining which attaches to a rim and a web extends from said rim, said web substantially defining said one brake shoe projecting portion.

3. In a drum brake assembly having a backing plate which supports a pair of brake shoes, a hydraulic actuator which urges the pair of brake shoes into a braking position engaging a drum and an adjustment mechanism disposed between the pair of brake shoes for maintaining a running clearance between the pair of brake shoes and the drum, the improvement in which a connecting member connects with said adjustment mechanism, one of said pair of brake shoes, and said backing plate in order to actuate said adjustment mechanism when said one brake shoe moves relative to said backing plate, said one brake shoe including a projecting portion slidably engaging said connecting member to connect said connecting member with said one brake shoe;

said connecting member comprising a cable and said one brake shoe projecting portion includes a groove to form a guide for receiving said cable.

4. In a drum brake assembly having a backing plate which supports a pair of brake shoes, a hydraulic actuator which urges the pair of brake shoes into a braking position engaging a drum and an adjustment mechanism disposed between the pair of brake shoes for maintaining a running clearance between the pair of brake shoes and the drum, the improvement in which a connecting member connects with said adjustment mechanism, one of said pair of brake shoes, and said backing plate in order to actuate said adjustment mechanism when said one brake shoe moves relative to said backing plate, said one brake shoe including a projecting portion slidably engaging said connecting member to connect said connection member with said one brake shoe;

said one brake shoe including a rim and a web projecting from said rim, said projecting portion of said one brake shoe projecting from said rim and being disposed adjacent said web and opening away from said web.

* * * * *